July 11, 1933.  H. J. ALDERSON  1,918,204

AIRCRAFT

Filed July 20, 1932  3 Sheets-Sheet 1

INVENTOR
H. J. Alderson
By E. J. Featherstonhaugh
ATTORNEY

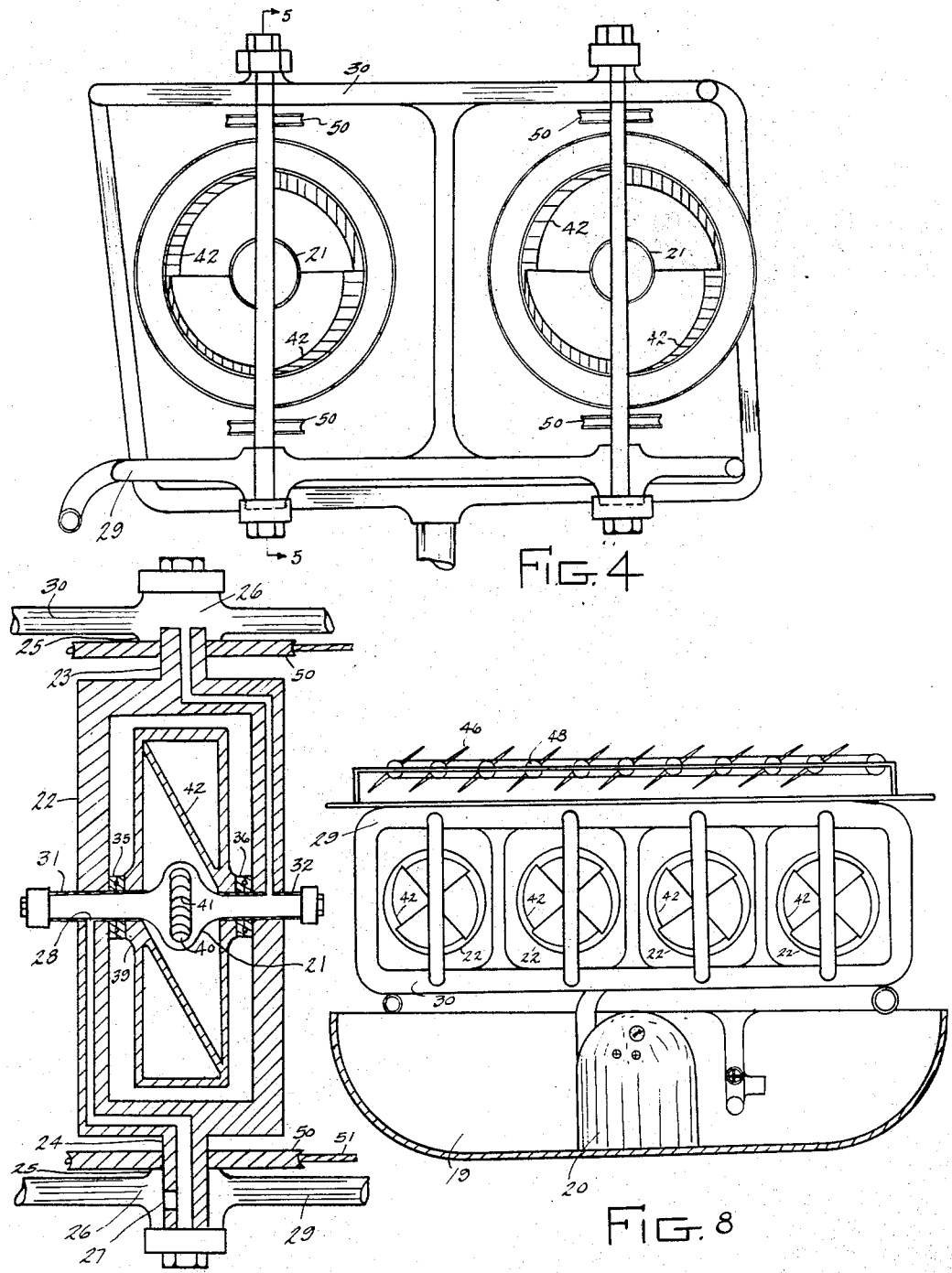

July 11, 1933.  H. J. ALDERSON  1,918,204
AIRCRAFT
Filed July 20, 1932  3 Sheets-Sheet 3
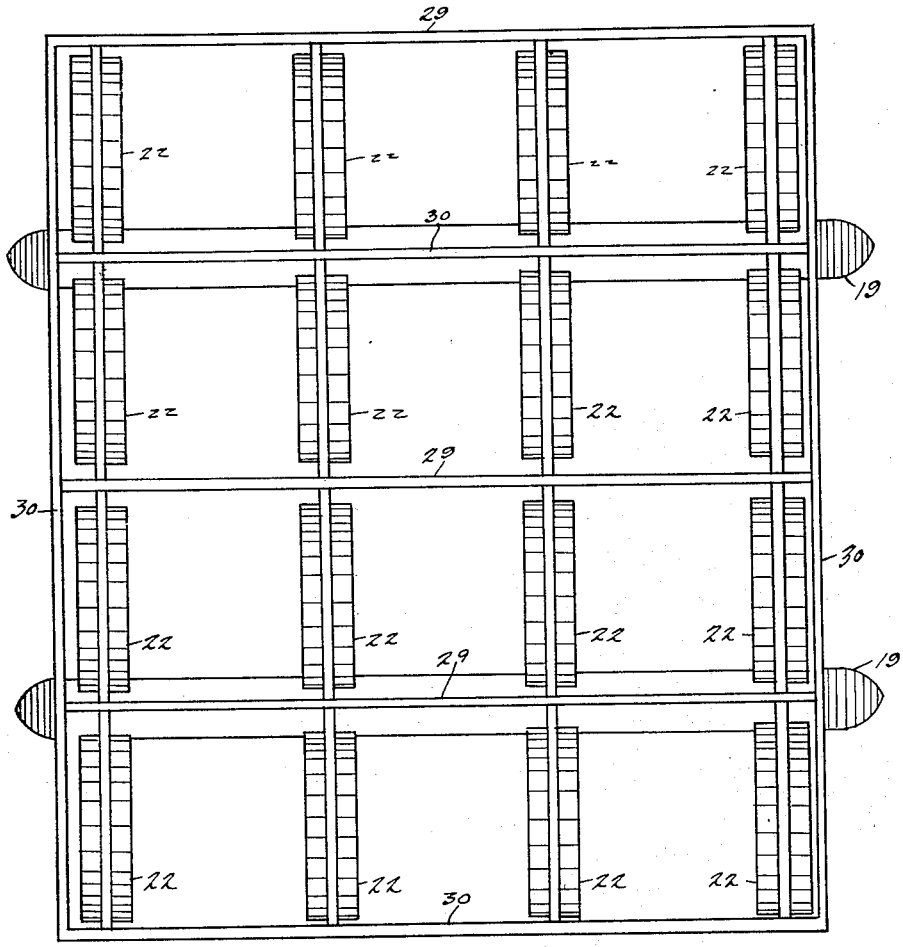
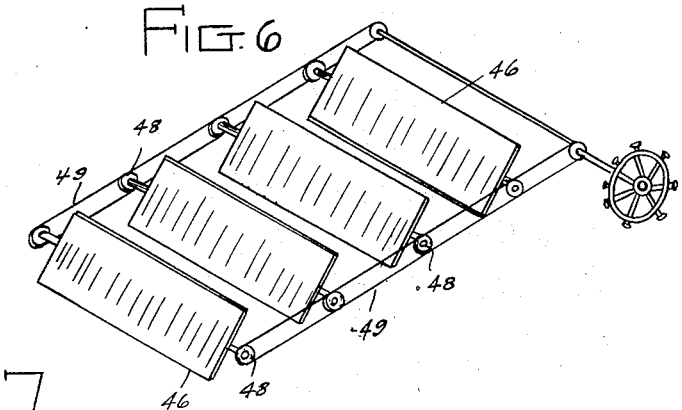
FIG. 6
FIG. 7

Patented July 11, 1933

1,918,204

UNITED STATES PATENT OFFICE

HERBERT JAMES ALDERSON, OF TORONTO, ONTARIO, CANADA

AIRCRAFT

Application filed July 20, 1932. Serial No. 623,662.

The invention relates to improvements in aircraft, as described in the present specification and illustrated in the accompanying drawings which form a part of the same.

The invention consists essentially of the novel features of construction pointed out broadly and specifically in the claims for novelty following a description containing an explanation in detail of an acceptable form of the invention.

The objects of the invention are to minimize the danger in aviation due to weather conditions and faulty construction by devising an aircraft which will adapt itself to the changes in the air currents and consequently stabilize its position in the air; to avoid possible mishaps in aircrafts in landing and take-offs either on land or water and consequently save life and property due to such smash-ups; to facilitate the handling of aircrafts so that they can be directed in their motion of travel either vertically or horizontally and in either directions so that such aircrafts may land in the minimum of space without the necessity of having extensive landing fields or open waterways; to construct an aircraft that will be adapted to support heavy loads and thereby enable the handling of cargo bulk as well as increase the capacity for passengers; to simplify aircraft construction by enabling aircrafts to be formed in units so that such units may be welded together or secured in any convenient way to form larger crafts and materially reducing the cost of manufacture and eliminate the necessity of overstocking various sized crafts in factory production; to obviate the necessity of carrying heavy loads of fuel by furnishing a means whereby the propulsion of the aircraft may be maintained under a very low fuel supply; and generally to provide an aircraft that will be durable in construction and efficient for the purpose set forth.

In the drawings, Figure 1 is a front elevational view of the aircraft.

Figure 4 is an enlarged front fragmentary detail of several of the propellers.

Figure 5 is a vertical sectional view taken on the lines 5—5 in Figure 4 showing the positions of the propellers and forming a part of one of the turbines.

Figure 6 is a plan view of the aircraft taken on the lines 6—6 in Figure 2.

Figure 7 is a fragmentary detail of a portion of the elevators.

Figure 8 is a fragmentary side view showing the generator and its connection to the propellers and frame.

Like numerals of reference indicate corresponding parts in the various figures.

Figure 1:
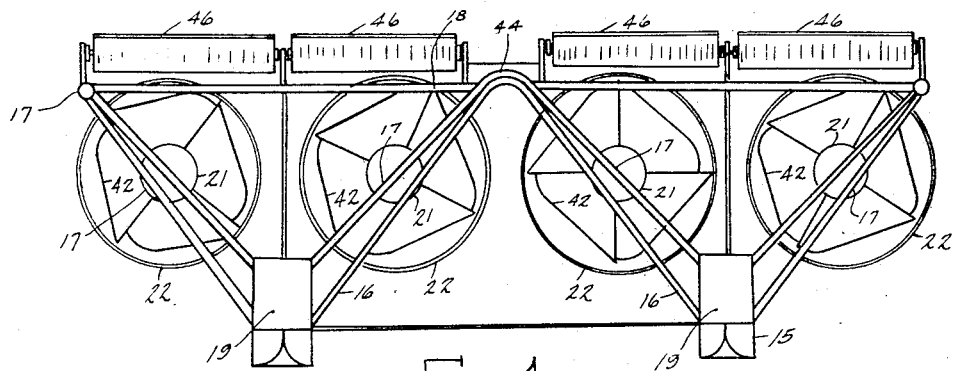
Figure 2:
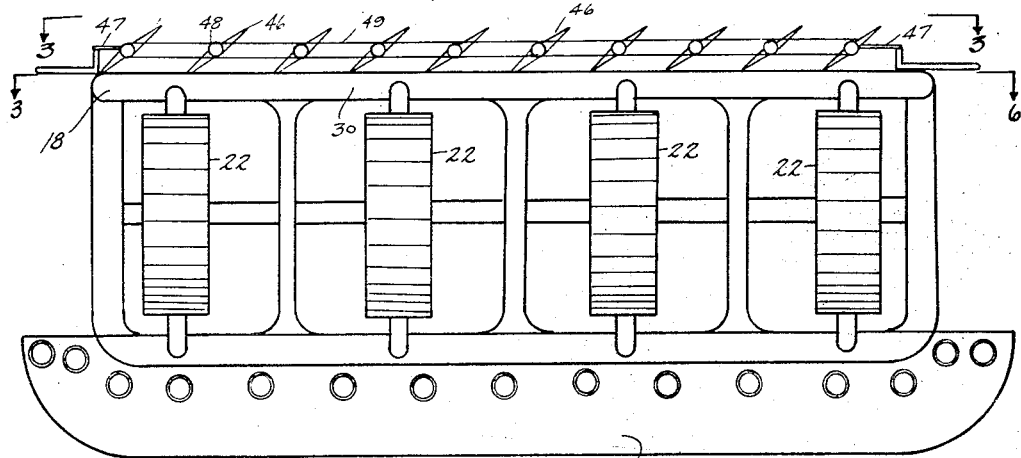
Figure 2 is a side elevational view of the aircraft.
Figure 3:
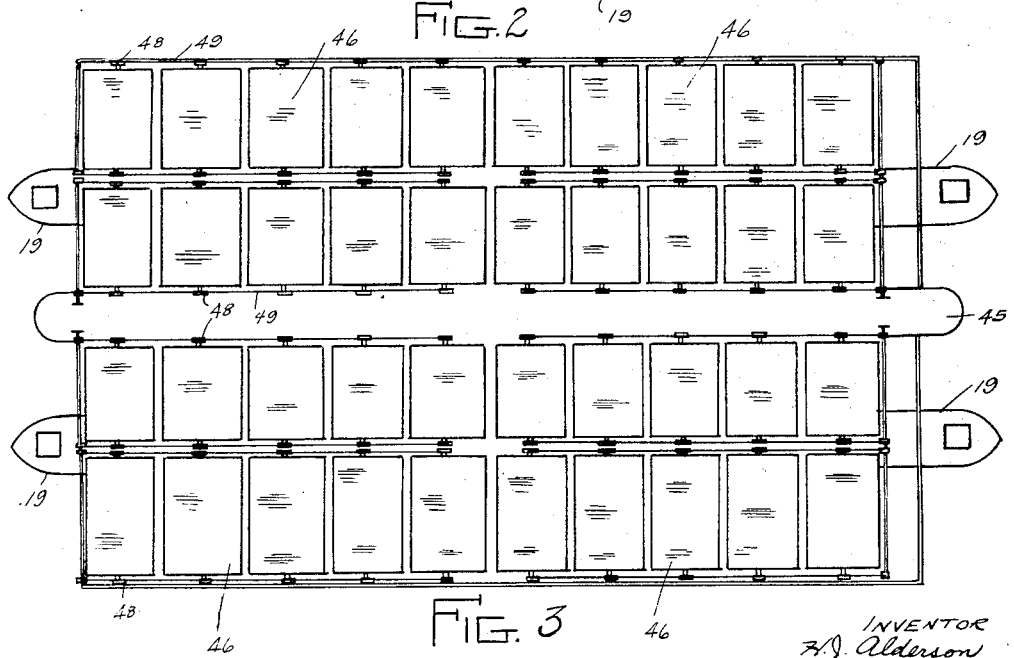
Figure 3 is a plan view of the aircraft taken on the lines 3—3 in Figure 2.

Referring to the drawings, the aircraft is formed of a fuselage as indicated by the numeral 15 and has the struts and braces 16 which form the frame 17. The frame is so constructed as to be in angular form and is made from a suitable metal containing the hollow tubes 18, the purpose for which will be hereinafter more particularly described.

The saloons or cabins 19 form the lower apex of the angular frames and provide quarters for the crew, passengers and cargo and in these saloons are inserted the generators 20 which form the fuel reservoir for the steam turbines 21 which are pivotally mounted on the frame 17.

Each of the steam turbines is formed of a casing 22 open at the front and rear and has the upper and lower hubs 23 and 24 and which are pivotally mounted in the bearings 25 of the housings 26 formed in the frame 17.

The hubs 23 and 24 have the ports 27 and 28 which are adapted to correspond with the fuel pipes 29 and 30 formed in the frame 17 and which are connected to the generator 20. The tubular passages 31 and 32 extend from the ports 27 and 28 respectively into the casing 22 and lead into the tubular studs 33 and 34 and which have the thrust bearings 35 and 36 into which the tubular shaft 37 extends and is secured.

The shaft 37 is rigidly secured to the inner casing 38 which is open at the front and rear and has a housing 39 containing the rotor 40 having the curved vanes 41 forming a rigid part thereof.

The inner casing 38 has the propeller blades 42 and 43 which form a rigid part of the inner casing and set at an angle extending from the front to the rear of the casing and above and below the housing 39 of the turbine 21.

It will thus be seen that upon the steam entering the ports 27 and 28 into the tubular passages 31 and 32 and into the studs 33 and 34 of the shaft 37, the rotor 40 will immediately begin to rotate and consequently since it forms a rigid part of the inner casing, the whole will rotate thereby impelling the necessary power and each of the turbines on the craft are similarly operated and it is of course understood that one, two or a plurality of these turbines may be used on an aircraft according to the size and requirements.

The upper apex 44 of the frame 17 may form the basis of a support of a bridge or cabin 45 where the actual controls of the aircraft may be placed and at the same time this bridge will divide the turbine in series, the purpose for which will hereinafter be more particularly described and on either side of the bridge are situated the elevators 46 which are pivotally mounted in the elevator frames 47 and may be connected in series by means of the pulleys 48 and belts 49.

The elevators are so arranged as to be pivoted either in an upward or downward direction while the steam turbines are so pivoted as to pivot in a rearward or forward direction and it is through the controls of the elevators and the steam turbines that the movements of the aircraft are guided and pulleys 50 and belts 51 are provided to each of the turbines so as to connect them in series and in certain cases certain sets of the elevators may be connected with the controls of certain sets of the turbines so that when it is desired to bank the aircraft during its progress in the air, one set of elevators may be lowered or raised as the case may be coincidently with the reversing of one set of turbines so that between allowing the inrush of air through the elevators and thrusting the air in a certain direction by the turbines, the craft will be manipulated in the desired direction.

It is of course understood that in certain cases, the controls for the elevators may be entirely separate from the controls of the turbines and that such controls may be placed in any suitable locality in the aircraft. The size of the aircraft may be easily enlarged or reduced according to the requirements as it may be constructed in the form of units having a certain number of turbines and elevators and these units may be welded or fastened in any suitable way to one another in order to enlarge the craft, so that in this way, the factory production may be handled on a more commercial plan than could otherwise occur at the present time in mass production.

In the operation of the invention, the power for rotating the turbines is generated in the generators provided therefore in the cabins. Fuel is of course optional as alcohol, gas and similar substance may be used and the generator converts the fuel into gas which is directly fed to the various turbines by means of the fuel pipes which form an integral portion of the angular metal frame.

The fuel pipes directly connect the turbines and when it is desired for the aircraft to take-off either from land or water, the turbines are rotated and the elevators raised and the aircraft will automatically begin to lift from the ground or water upwardly to the desired height. When it is desired to bank the craft, either to the left or right, all that is necessary is to regulate the angles of the elevators and reverse certain sets of turbines and the aircraft will bank in the desired direction and the same thing occurs in landing.

It is of course understood that the aircraft may be modified so as to have the turbines rotatable in any direction which will obviate the necessity of using elevators since by simply changing the angle of the propellers, the ship will rise in the same direction as the propellers are pointing to. Many modifications may be made in the aircraft construction but the same principle would be utilized in every case.

What I claim is:

1. In an aircraft, a fuselage, a metal frame extending from said fuselage, a plurality of turbines pivotally mounted in said frame, each of said turbines having a pivoted casing and an inner rotatable casing, and a turbine wheel within said rotatable casing and forming a rigid part thereof and having passages leading to and fro suitably connected to fuel inlet and exhaust passages forming a part of the metal frame, and propellers rigidly secured in the inner casing facing the exposed front and rear of said outer casing, and means connected to the outer casings of said turbines and controlling the movements thereof.

2. In an aircraft, a fuselage, a tubular metal frame extending from said fuselage, a plurality of turbines pivotally mounted in said frame and having inlets and exhausts connected to the tubular members of the frame, elevators pivotally mounted to said frame, means for converting fuel into steam and delivering the same to the turbines through the tubular members of the frame, and means for controlling the movements of said turbines and elevators.

3. In an aircraft, a fuselage, a tubular angular frame forming upper and lower apexes, cabins secured to the apex portions of said frame, a plurality of turbines pivotally mounted in the frame and having inlets and exhausts leading therefrom and connected to the tubular member of said frame, elevators journalled on said frame, means for forming gases and directing the same to the tubular members of the frame and means for controlling the movements of said turbines and elevators.

4. In an aircraft, a fuselage, a tubular angular frame, upper and lower frames connecting the angular portions of the metal frame together, cabins secured to the acute ends of said angular frames, elevators pivotally mounted in the upper frame, a plurality of turbines pivotally mounted in said angular frame, generators mounted in one or other of said cabins and connected to said turbines through said angular frame and means for controlling the movements of said turbines and elevators from another of said cabins.

5. In an aircraft, a fuselage, an angular tubular frame, a plurality of turbines journalled in said frame, cabins mounted in the apex portion of said frame, elevators above said turbines secured in said frame, generators connected to the tubular portion of said frame for directing the gases converted from the fuel to said turbines, and means for controlling the movements of said turbines and said elevators respectively.

6. In an aircraft, a fuselage, a tubular metal frame extending from said fuselage, a plurality of turbines journalled in said metal frame, each of said turbines formed of an outer pivoted casing having the upper and lower hubs secured in thrust bearings of said frame and forming inlet and exhaust passages, sleeves extending inwardly from said outer casing and having ports adapted to communicate with the inlet and exhaust passages of said outer casing and forming journal members for a hollow shaft, a turbine wheel rigidly secured to said shaft and to an inner casing, propellers secured to said inner casing facing the open ends of the outer casing and means for controlling the movements of said turbines.

7. In an aircraft, a fuselage, an angular tubular frame extending therefrom, a plurality of turbines pivotally mounted in said frame and adapted to be pivoted from left to right, a plurality of elevators above said turbines pivoted in said frame and adapted to be tilted in an upward or downward motion for offsetting the left or right pivoting motions of said turbines, and means controlling the movements of said turbines and elevators.

8. In an aircraft, an upper and lower frame-work supported by an intermediate angular tubular frame merging from common apex points, cabins secured to the apex portion of said angular frame, elevators mounted in said upper frame and pivoted thereto, turbines secured to said intermediate frames and having inlet and exhaust ports communicating with the tubular portion of said frame, means for transmitting the gas to the turbines through said tubular frame and means for controlling the movements of said elevators and said turbines.

9. In an aircraft, an angular tubular frame having longitudinal and transverse beams connecting the angular portions together and adapted to centralize the weight of the aircraft in the angular portion thereof, cabins suitably supported from said frame, a plurality of turbines pivotally mounted in said frame and having inlets and exhausts connected to the tubular members of the frame, means for delivering the gas from one or other of said cabins to the turbines through said tubular members and means for controlling the movements of said turbines.

10. In an aircraft, a fuselage, a tubular metal frame W-shaped in cross section forming a part of the fuselage and having cross beams connecting the acute portions of the metal frame together, a plurality of motors centrally and pivotally supported in said metal frame, a plurality of elevators pivotally secured to said metal frame in an opposite direction to the pivoting of said motors, and means for controlling said motors and elevators.

11. In an aircraft, a fuselage, a tubular metal frame V-shaped in cross section forming a part of the fuselage, means pivotally secured to said frame and elevators mounted on said frame and completing an individual unit, and a fuselage having a metal frame V-shaped in cross section and containing and supporting motors and elevators and forming another unit adapted to be secured to the first mentioned unit to complete a single aircraft, and means for controlling the movements of said motors and elevators.

12. In an aircraft, a fuselage, an angular tubular metal frame forming a portion of said fuselage, a plurality of motors in rows pivotally secured in said angular frame and having intercommunicating fuel passages leading from the motors into said angular tubular metal frame, a plurality of elevators pivotally mounted on said metal frame and quantity approximately two to one of the number of said motors and means for controlling the movements of said motors and elevators.

13. In an aircraft, a fuselage, an angular tubular metal frame forming a part of said fuselage, a plurality of cabins in triangular formation forming a part of said fuselage, a plurality of motors pivotally secured to said tubular frame, a plurality of elevators pivotally mounted on said motors, and means for controlling the movements of said motors and elevators from the upper cabin of the fuselage.

14. In an aircraft, a fuselage, an angular tubular metal frame forming a part of said fuselage, a plurality of motors pivotally mounted in said frame in a vertical position and adapted to rotate in either direction, elevators pivotally mounted on said frame in a horizontal direction in relation to said motors, and means for controlling the movements of said elevators and motors separately or together.

15. In an aircraft, a fuselage, an angular tubular metal frame forming a part of said fuselage, a plurality of motors having shaftless propellers pivotally mounted in the angular portion of said frame, elevators pivotally mounted on said frame, a fuel connection connected to said motors through said tubular frame and means for controlling the movements of said motors and elevators.

16. In an aircraft, a fuselage, an angular tubular frame, a plurality of turbines pivotally mounted in said frame and having air thrusting members forming a rigid part thereof and rotating therewith, elevators pivoted on said frame and means for controlling said elevators and said turbines.

17. In an aircraft, an angle metal frame, cabins forming a part of said metal frame at the acute angles thereof and forming the centres of gravity, a plurality of turbines pivotally mounted in said angle frame, a plurality of elevators pivotally mounted on said frame, fuel lines from one or other of said cabins connected to said turbines through a plurality of tubes forming a part of said metal frame, and means for controlling the movements of said turbines and elevators.

18. In aircraft construction, a plurality of fuselages, tubular metal frames extending from said fuselages, a plurality of turbines pivotally mounted in said frames and having inlets and exhausts connected to the tubular members of the frame, elevators pivotally mounted to said metal frames, means for converting fuel into steam and delivering the same to the turbines through the tubular members of the frames, means for controlling the movement of said turbines and elevators and means for disconnecting said fuselages into individual means.

Signed at Toronto, Canada, this 2nd day of May, 1932.

HERBERT JAMES ALDERSON.